(12) United States Patent
Chikahara et al.

(10) Patent No.: US 12,182,679 B2
(45) Date of Patent: Dec. 31, 2024

(54) CAUSALITY ESTIMATION OF TIME SERIES VIA SUPERVISED LEARNING

(71) Applicant: NIPPON TELEGRAPH AND TELEPHONE CORPORATION, Tokyo (JP)

(72) Inventors: Yoichi Chikahara, Tokyo (JP); Akinori Fujino, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 1127 days.

(21) Appl. No.: 17/044,783

(22) PCT Filed: Mar. 29, 2019

(86) PCT No.: PCT/JP2019/014236
§ 371 (c)(1),
(2) Date: Oct. 1, 2020

(87) PCT Pub. No.: WO2019/194105
PCT Pub. Date: Oct. 10, 2019

(65) Prior Publication Data
US 2021/0117840 A1    Apr. 22, 2021

(30) Foreign Application Priority Data
Apr. 3, 2018  (JP) .................................. 2018-071917

(51) Int. Cl.
G06N 20/10    (2019.01)
G06F 18/214   (2023.01)
(Continued)

(52) U.S. Cl.
CPC .......... *G06N 20/10* (2019.01); *G06F 18/214* (2023.01); *G06F 18/2431* (2023.01); *G06N 7/01* (2023.01); *G06N 20/00* (2019.01)

(58) Field of Classification Search
CPC ............. G06N 3/08; G06N 3/09; G06N 20/00
See application file for complete search history.

(56) References Cited

FOREIGN PATENT DOCUMENTS

JP    2017-228256    12/2017

OTHER PUBLICATIONS

Benozzo, Danilo, Emanuele Olivetti, and Paolo Avesani. "Supervised estimation of granger-based causality between time series." Frontiers in Neuroinformatics 11 (Nov. 2017): 68. (Year: 2017).*

(Continued)

*Primary Examiner* — Benjamin P Geib (57) ABSTRACT

A technique for estimating a causal relation, which can solve problems of a conventional technique and which does not require preliminary setting of a regression model is disclosed. An embodiment of the present invention relates to a causal relation learning device including: a feature value calculation unit that receives a correct label of three or more classification labels related to a causal relation of time-series data and time-series data corresponding to the correct label and calculates a feature value of the time-series data; and a classifier learning unit that learns a classifier using a set of the feature value and the correct label so that an output of the classifier with respect to the feature value is a largest value of an output value of the correct label.

15 Claims, 3 Drawing Sheets

(51) Int. Cl.
　　　G06F 18/2431　　(2023.01)
　　　G06N 7/01　　　(2023.01)
　　　G06N 20/00　　　(2019.01)

(56) References Cited

OTHER PUBLICATIONS

Agrawal, Gaurav, Aniruddh Kumar Srivastav, and Ankita Srivastava. "A study of exchange rates movement and stock market volatility." International Journal of business and management 5.12 (2010): 62. (Year: 2010).*

Granger, C. W. J., "Investigating Causal Relations by Econometric Models and Cross-spectral Methods," Econometrica, vol. 37, Issue 3 (Aug. 1969) 424-438.

Bell, David, et al., "A non-parametric approach to non-linear causality testing," Economics Letters 51 (1996) 7-18.

Zhu, Pingping, et al, "Learning Nonlinear Generative Models of Time Series with a Kalman Filter in RKHS," IEEE Transactions on Signal Processing, vol. 62, No. 1, Jan. 2014.

Rahimi, Ali, et al., "Random Features for Large-Scale Kernel Machines," NIPS Dec. 3, 2007, pp. 1177-1184.

Lopez-Paz, David, et al., "Towards a Learning Theory of Cause-Effect Inference," arXiv:1502.02398v2 [stat.ML] May 18, 2015, Proceedings of the 32nd International Conference on Machine Learning, Lille, France, JMLR: W&CP vol. 37.

Marinazzo, D., et al., "Kernel-Granger causality and and the analysis of dynamical networks," Physical Review E 77, 056215 (2008) 1539-3755/2008/77(5)/056215(9).

Schreiber, Thomas, "Measuring Information Transfer," Physical Review Letters, vol. 85, No. 2, Jul. 10, 2000.

Garreau, Damien, et al., "Large sample analysis of the Median," Imsart-Generic Ver. Oct. 16, 2014 File: Arxiv_Version.Tex Dated: Oct. 31, 2018.

Chikahara, Takao, et al., "Causal Inference of Bivariate Time-Series Based on Supervised Learning," The Institute of Electronics, Information and Communication Engineers, Research and Development Report, IEICE Technical Report IBISML Feb. 2016 (Jul. 2016).

Chikahara, Yoichi, et al, "Causal Inference in Time Series via Supervised Learning," Proceedings of the Twenty-Seventh International Joint Conference on Artificial Intelligence (IJCAI-18).

* cited by examiner

Fig. 3

CAUSALITY ESTIMATION OF TIME SERIES VIA SUPERVISED LEARNING

CROSS-REFERENCE TO RELATED APPLICATIONS

This application is a U.S. 371 Application of International Patent Application No. PCT/JP2019/014236, filed on 29 Mar. 2019, which application claims priority to and the benefit of JP Application No. 2018-071917, filed on 3 Apr. 2018, the disclosures of which are hereby incorporated herein by reference in their entireties.

TECHNICAL FIELD

The present invention relates to a technique for learning and estimating a causal relation of time-series data.

BACKGROUND ART

Generally, when variables X and Y are in a cause-and-effect relation, the variables X and Y are in a causal relation. Granger causality is one of definitions of a causal relation in a time series. In Granger causality, a causal relation is defined such that, if a past value of a variable X is useful in predicting a future value of a variable Y, X is the cause of Y.

In a technique of estimating Granger causality, the presence of a causal relation is estimated on the basis of whether dependency between variables follows a specific regression model. For example, Granger causality is estimated using a regression model called a VAR (Vector Auto-Regressive) mode in NPL 1 while using a regression model called a GAM (Generalized Additive Model) in NPL 2.

CITATION LIST

Patent Literature

[PTL 1] Japanese Patent Application Publication No. 2017-228256

Non Patent Literature

[NPL 1] C. W. Granger, "Investigating causal relations by econometric models and cross-spectral methods", Econometrica: Journal of the Econometric Society, pages 424-438, 1969.
[NPL 2] D. Bell, J. Kay, and J. Malley, "A non-parametric approach to non-linear causality testing", Economics Letters, 51(1): 718, 1996.
[NPL 3] Pingping Zhu, Badong Chen, and Jose C. Principe, "Learning nonlinear generative models of time series with a Kalman filter in RKHS", Signal Processing, IEEE Transactions on, 62(1): pages 141-155, 2014.
[NPL 4] Ali Rahimi and Benjamin Recht, "Random features for large-scale kernel machines", In NIPS, pages 1177-1184, 2007.
[NPL 5] David Lopez-Paz, Krikamol Muandet, Bernhard Schoelkopf, and Ilya Tolstikhin, "Towards a learning theory of cause-effect inference", In ICML, JMLR, 2015.
[NPL 6] D. Marinazzo, M. Pellicor, and S. Stra-maglia, "Kernel-Granger causality and the analysis of dynamical networks", Physical Review E, 77(5): 056215, 2008.
[NPL 7] T. Schreiber, "Measuring information transfer", Physical review letters, 85(2): 461, 2000.
[NPL 8] B. Scholkopf and A. J. Smola, "Learning with kernels: support vector machines, regularization, optimization, and beyond, MIT press, 2001.

SUMMARY OF THE INVENTION

Technical Problem

However, in order to estimate Granger causality correctly using such a technique, it is necessary to select a regression model capable of smoothly fitting given time-series data. Since specialized knowledge in regression methods is required for selecting an appropriate regression model, it is not easy to estimate Granger causality correctly using such a technique.

Since NPL 1 and 2 use regression models called a VAR model and GAM, respectively, it is not possible to estimate Granger causality correctly if these regression models cannot fit time-series data smoothly. Therefore, a technique for estimating a causal relation, which does not require such preliminary setting of a regression model, is required in a technical field of estimating Granger causality.

On the other hand, PTL 1 discloses a technique of estimating a causal relation related to two-variable time series, which does not require preliminary setting of a regression model. This technique is not based on a regression model but on an approach of estimating a causal relation of time series by learning a classification device.

However, this technique has several problems. (i) How a classification device can estimate a causal relation of time series correctly and an operation principle thereof are unclear. (ii) The technique can be applied to only time-series data of two variables but cannot be applied to time-series data of three or more variables. (iii) Since a two-value classifier is learned, it is not possible to estimate the direction and the presence of a causal relation between variables simultaneously.

An object of the present invention is to provide a technique for estimating a causal relation, which can solve problems of a conventional technique and which does not require preliminary setting of a regression model is disclosed.

Means for Solving the Problem

In order to solve the problems, an embodiment of the present invention relates to a causal relation learning device including: a feature value calculation unit that receives a correct label of three or more classification labels related to a causal relation of time-series data and time-series data corresponding to the correct label and calculates a feature value of the time-series data; and a classifier learning unit that learns a classifier using a set of the feature value and the correct label so that an output of the classifier with respect to the feature value is a largest value of an output value of the correct label.

Effects of the Invention

According to the present invention, it is possible to provide a technique for estimating a causal relation, which can solve problems of a conventional technique and which does not require preliminary setting of a regression model is disclosed.

DESCRIPTION OF EMBODIMENTS

In the following embodiment, a classification and learning device and a classification and estimation device for learning and estimating a causal relation of time-series data of two or more variables are disclosed. A classification and learning device and a classification and estimation device according to an embodiment to be described later can learn and estimate a causal relation of time-series data without requiring preliminary setting of a regression model. Moreover, the classification and learning device and the classification and estimation device are constructed in such a form that an operation principle thereof is more clearly as compared to the conventional causal relation estimation technique. Therefore, the devices can calculate a feature value of classification on the basis of a definition of Granger causality and can be applied to time-series data related to multiple variables. Moreover, the devices are realized by learning a three-value classifier in order to estimate the presence and the direction of a causal relation simultaneously.

Specifically, in the following embodiments, a time-series data causal relation classification and learning device according to three embodiments are disclosed. A classification and learning device according to a first embodiment is applied to time-series data (hereinafter referred to as two-variable time-series data) related to two variables X and Y. A classification and learning device according to a second embodiment is applied to time-series data (hereinafter referred to as three-variable time-series data) including a third variable Z in addition to the two variables X and Y. A classification and learning device according to a third embodiment is applied to time-series data related to n variables (n>3).

Any of the classification and learning devices learns a three-value (X→Y, X←Y, and No causation) classifier using time-series data (hereinafter referred to as training data) of which the causal relation is known, such as (i) time-series data of which the causal relation is represented by X→Y (that is, a variable X is a cause of a variable Y), (ii) time-series data of which the causal relation is represented by X←Y (that is, a variable Y is a cause of a variable X), or (iii) time-series data of which the causal relation is represented by No Causation (that is, there is no causal relation between variables X and Y) and predicts a label of time-series data (hereinafter referred to as test data) of which the causal relation is unknown.

A three-value classification device according to an embodiment of the present invention will be described with reference to FIG. 1. A three-value classification device according to the present embodiment learns a classifier using training data with respect to continuous time-series data related to two variables X and Y included in a database, assigns classification labels to test data, and estimate a causal relation between the variables X and Y. For example, it is assumed that samples without classification labels including two-variable time-series data made up of time series (X) related to yen/dollar exchange rates and time series (Y) related to stock prices of a specific company are provided. In this case, first, training data is prepared by artificially generating a set of two-variable time-series data in which a causal relation between variables is known, for example, and a classifier is learned using the training data. After that, classification labels for test data are predicted using the learned classifier and it is estimated whether a causal relation between the two variables X and Y is (i) X→Y (that is, an exchange rate is a cause and the stock price of a company is an effect), (ii) X←Y (that is, the stock price of a company is a cause and the exchange rate is an effect), or (iii) No Causation, that is, the presence and the direction of a causal relation are estimated.

In a three-value classification device according to a first embodiment, in order to assign classification labels of two-variable time-series data (test data) related to variables X and Y of which the causal relation between the variables X and Y is unknown, a classifier is learned using training data made up of two-variable time-series data of which the causal relation is represented by X→Y, two-variable time-series data of which the causal relation is represented by X←Y, and two-variable time-series data of which the causal relation is No Causation.

In a three-value classification device according to a second embodiment, in order to assign classification labels of three-variable time-series data (test data) related to variables X, Y, and Z of which the causal relation between X and Y is unknown, a classifier is learned using training data made up of three-variable time-series data of which the causal relation is represented by X→Y, three-variable time-series data of which the causal relation is represented by X←Y, and three-variable time-series data of which the causal relation is No Causation.

In a three-value classification device according to a third embodiment, in order to assign classification labels of n-variable time-series data (test data) related to X, Y, and $Z_v$ (v=1, . . . , n−2; where n>3) of which the causal relation between variables X and Y is unknown, a probability of the causal relation of X→Y, a probability of the causal relation of X←Y, and a probability of the causal relation of No Causation are calculated for a triple of variables (X, Y, $Z_v$) in the test data using the classifier learned in the second embodiment, and classification labels are assigned by taking the average of the classification probabilities with respect to v.

Any of the three-value classification devices according to the first to third embodiments outputs classification labels estimated for test data in which the causal relation is unknown. Any of the three-value classification probability calculation devices according to the first to third embodiments outputs an estimation probability (a three-value classification probability) of classification labels with respect to samples without classification labels in which the causal relation is unknown.

The three-value classification devices and the three-value classification probability calculation devices according to the first to third embodiments may be typically realized by a calculation device such as a server and may include a drive device, an auxiliary storage device, a memory device, a processor, an interface device, and a communication device connected to each other via a bus, for example. Various computer programs including a program that realizes various functions and processing of the three-value classification devices and the three-value classification probability calculation devices according to the first to third embodiments may be provided by a recording medium such as a CD-ROM (Compact Disk-Read Only Memory), a DVD (Digital Versatile Disk), or a flash memory. When a recording medium having a program stored therein is set in a drive device, a program is installed from the recording medium into an auxiliary storage device via the drive device. However, installing of a program may not necessarily be performed by a recording medium and the program may be downloaded from any external device via a network or the like. The auxiliary storage device stores the installed program and stores necessary files, data, and the like. The memory device reads and stores the program and data from the auxiliary storage device when a program activation instruction is issued. The processor executes various functions and processing of the three-value classification devices and the three-value classification probability calculation devices according to the first to third embodiments to be described later according to various pieces of data such as programs stored in the memory device and parameters necessary for executing programs. The interface device is used as a communication interface for connecting to a network or an external device. The communication device executes various communication processes for communicating with a network such as the Internet.

However, the three-value classification devices and the three-value classification probability calculation devices according to the first to third embodiments are not limited to the above-described hardware configuration but may be realized by other arbitrary appropriate hardware configuration.

[Three-Value Classification Device According to First Embodiment]

First, a three-value classification device will be described. FIG. 1 is a block diagram illustrating a functional configuration of a three-value classification device according to an embodiment of the present invention. Any of the three-value classification devices and the three-value classification probability calculation devices according to the above-described first to third embodiments includes the illustrated functional configuration although there is a difference in the details of the processing of the respective constituent components as will be described later.

Figure 1:
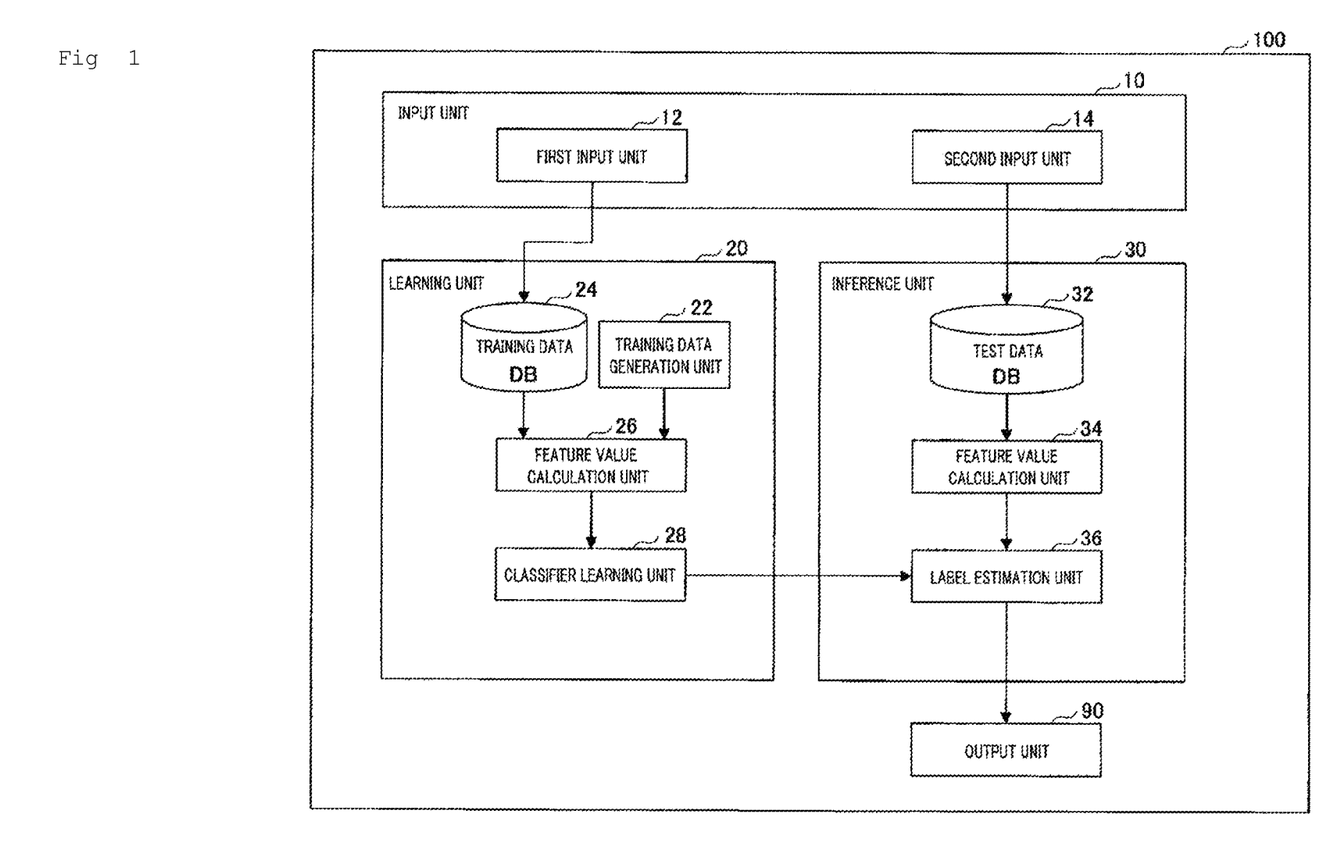
FIG. 1 is a block diagram illustrating a functional configuration of a three-value classification device according to an embodiment of the present invention.

As illustrated in FIG. 1, a three-value classification device 100 includes an input unit 10, a learning unit 20, an inference unit 30, and an output unit 90.

The input unit 10 receives various pieces of data such as training data, test data, and parameters used for calculation of feature quantities. In the illustrated embodiment, the input unit 10 includes a first input unit 12 and a second input unit 14. The first input unit 12 receives parameters and/or training data used for a feature value calculation unit 26. The training data is stored in a training data database (DB) 24. The second input unit 14 receives parameters and/or test data used for a feature value calculation unit 34. The test data is stored in a test data database (DB) 32.

The learning unit 20 learns a classifier that classifies time-series data into three values. In the illustrated embodiment, the learning unit 20 includes a training data generation unit 22, the training data DB 24, the feature value calculation unit 26, and a classifier learning unit 28 which will be described in detail below.

The inference unit 30 classifies test data into three values using the learned classifier. In the illustrated embodiment, the inference unit 30 includes the test data DB 32, the feature value calculation unit 34, and a label estimation unit 36 which will be described in detail below.

The output unit 90 outputs an inference result of the inference unit 30. That is, the output unit 90 outputs classification labels estimated for test data of which the classification labels are unknown.

When training data is not input to the first input unit 12 or the training data stored in the training data DB 24 is insufficient, the training data generation unit 22 generates two-variable time-series data of which classification labels indicating a causal relation are known as training data.

In an embodiment, the training data generation unit 22 generates training data including two-variable time-series data (hereinafter referred to as linear time-series data) in which the relation between two variables is represented as a linear function and two-variable time-series data (hereinafter referred to as nonlinear time-series data) in which the relation between two variables is represented as a nonlinear function in the following manner.

First, the training data generation unit 22 generates linear time-series data from the following VAR model.

$$\begin{bmatrix} X_t \\ Y_t \end{bmatrix} = \frac{1}{P}\sum_{r=1}^{P} A_r \begin{bmatrix} X_{t-r} \\ Y_{t-r} \end{bmatrix} + \begin{bmatrix} E_{X_t} \\ E_{Y_t} \end{bmatrix}$$ [Formula 1]

Here, $\tau=1, \ldots, P$ ($P \in \{1, 2, 3\}$), and noise components represented by Formula 2 below are sampled from a standard normal distribution $N(0.1)$.

$$E_{X_t}, E_{Y_t}$$ [Formula 2]

A coefficient matrix is given as follows in order to acquire time-series data of the causal relation of $X \rightarrow Y$.

$$A_r = \begin{bmatrix} a_r & 0.0 \\ c_r & d_r \end{bmatrix}$$ [Formula 3]

Here, coefficients $a_\tau$ and $d_\tau$ are sampled from a uniform distribution $U(-1, 1)$, and a coefficient $c_\tau$ is given randomly from $\{-1, 1\}$.

Moreover, time-series data of the causal relation of $X \leftarrow Y$ is generated by giving a coefficient matrix represented by Formula 4 below.

$$A_r = \begin{bmatrix} a_r & c_r \\ 0.0 & d_r \end{bmatrix}$$ [Formula 4]

Furthermore, time-series data of the causal relation of No Causation is generated by giving a coefficient matrix represented by Formula 5 below.

$$A_r = \begin{bmatrix} a_r & 0.0 \\ 0.0 & d_r \end{bmatrix}$$ [Formula 5]

On the other hand, the training data generation unit 22 generates nonlinear time-series data from a model represented by Formula 6 below using a VAR model and a standard sigmoid function $g(x)=1/(1+\exp(-x))$.

$$\begin{bmatrix} X_t \\ Y_t \end{bmatrix} = \frac{1}{P}\sum_{r=1}^{P} A_r \begin{bmatrix} X_{t-r} \\ g(Y_{t-r}) \end{bmatrix} + \begin{bmatrix} E_{X_t} \\ E_{Y_t} \end{bmatrix} \quad \text{[Formula 6]}$$

Here, τ, noise components represented by Formula 7 below, and a coefficient matrix $A_\tau$ are given similarly to the linear time-series data.

$$E_{X_t}, E_{Y_t} \quad \text{[Formula 7]}$$

The training data generation unit 22 normalizes the generated respective pieces of time-series data so that the average thereof is 0 and the variance thereof is 1. In this manner, the training data generation unit 22 generates two-variable time-series data of which the classification labels indicating a causal relation are known as training data and stores the generated training data in the training data DB 24.

Figure 2:
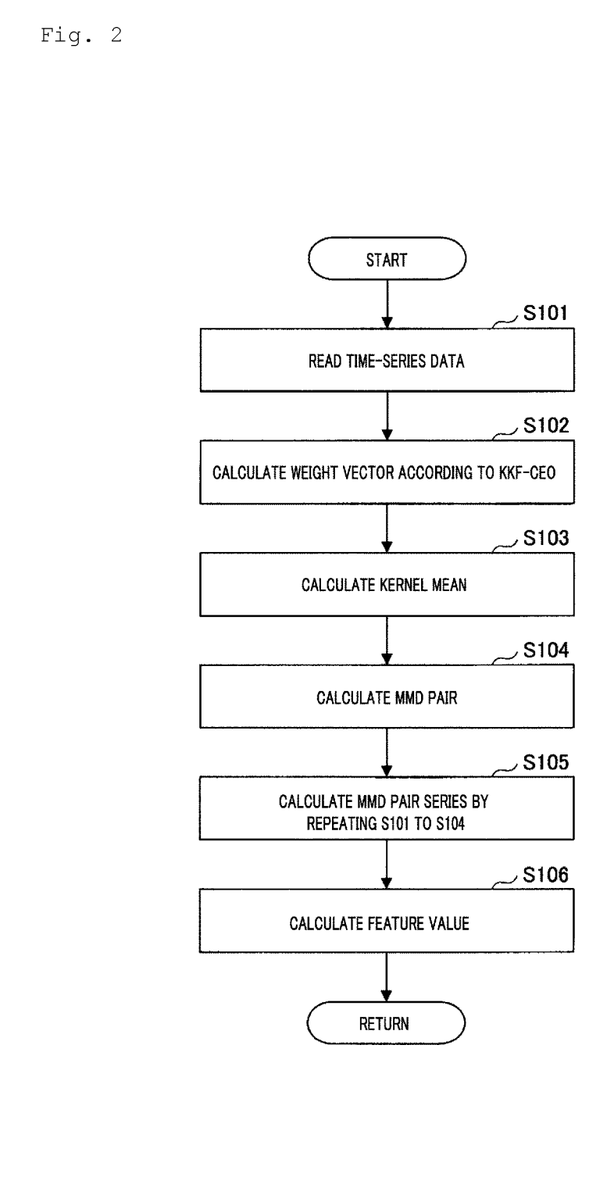
FIG. 2 is a flowchart illustrating a feature value calculation process according to an embodiment of the present invention.

The feature value calculation units 26 and 34 calculate feature quantities of the training data and the test data, respectively, according to the process flow illustrated in FIG. 2. In the present embodiment, without being limited to the following, the feature quantities of classifications of respective pieces of training data and respective pieces of test data are acquired using estimated values of the distances (hereinafter referred to as MMDs) defined between statistics called two kernel means. Specifically, the feature value calculation units 26 and 34 can acquire an estimated value of an MMD on the basis of a Kernel Kalman Filter based on Conditional Embedding Operator (hereinafter referred to as KKF-CEO) disclosed in NPL 3.

$S_X$ is defined as a set of observed values of variable X $(x_1, \ldots, x_t)$, and $S_Y$ is defined as a set of observed values of variable Y $(y_1, \ldots, y_t)$ (t>4). Using KKF-CEO, the following two kernel means can be estimated on the basis of these observed values.

[Formula 8]

$$\tilde{\mu}_{X_{t+1}|S_X,S_Y} = \sum_{r=2}^{t-2} w_r^{XY} \Phi_X(x_r) \quad (1)$$

$$\tilde{\mu}_{X_{t+1}|S_X} = \sum_{r=2}^{t-2} w_r^{X} \Phi_X(x_r) \quad (2)$$

Here, $\Phi_X$ represented by Formula 9 below is a function called a feature mapping defined by a positive definite kernel $k_X$.

$$\Phi_X(x_t) = k_X(x_t, \cdot) \quad \text{[Formula 9]}$$

Weight vectors of actual values are represented by Formula 10 below.

$$w^{XY} = [w_2^{XY}, \ldots, w_{t-2}^{XY}]^T, w^X = [w_2^X, \ldots, w_{t-2}^X]^T \quad \text{[Formula 10]}$$

The weight vectors $w^{XY}$ and $w_X$ can be calculated using the KKF-CEO. In the KKF-CEO disclosed in NPL 3, a technique for calculating the weight vector $w^X$ is proposed in order to estimate a kernel mean represented by Formula 11 below for an observed value $S_X$ of one-variable time series.

$$\hat{\mu}_{X_{T+1}|S_X} \quad \text{[Formula 11]}$$

The weight vector $w^{XY}$ can be calculated using KKF-CEO and a product kernel $k_X \cdot k_Y$.

Using kernel means obtained by Equations (1) and (2), an MMD is calculated as follows.

[Formula 12]

$$\widehat{MMD}^2_{X_{t+1}} = \sum_{r=2}^{t-2}\sum_{r'=2}^{t-2}(w_r^{XY}w_{r'}^{XY} + w_r^X w_{r'}^X - 2w_r^{XY}w_{r'}^X)k \times (x_r, x_{r'}) \quad (3)$$

Similarly, for the following two kernel means represented by Formula 13 below, an MMD is calculated as in Formula 14.

[Formula 13]

$$\hat{\mu}_{Y_{t+1}|S_X,S_Y} = \sum_{r=2}^{t-2} w_r^{XY} \Phi_Y(y_r) \quad (4)$$

$$\hat{\mu}_{Y_{t+1}|S_Y} = \sum_{r=2}^{t-2} w_r^{Y} \Phi_Y(y_r) \quad (5)$$

[Formula 14]

$$\widehat{MMD}^2_{Y_{t+1}} = \sum_{r=2}^{t-2}\sum_{r'=2}^{t-2}(w_r^{XY}w_{r'}^{XY} + w_r^Y w_{r'}^Y - 2w_r^{XY}w_{r'}^Y)k \times (y_r, y_{r'}) \quad (6)$$

Here, $\Phi_Y$ represented by Formula 15 below is a function called a feature mapping defined by a positive definite kernel $k_Y$.

$$\Phi_Y(y_t) = k_Y(y_t, \cdot) \quad \text{[Formula 15]}$$

A weight vector of actual values is represented by Formula 16 below, and similarly, can be estimated by KKF-CEO.

$$w^Y = [w_2^Y, \ldots, w_{t-2}^Y]^T \quad \text{[Formula 16]}$$

In order to calculate a feature value of classifications of observed values represented by Formula 17 below, of two-variable time series having a length of T, an MMD pair represented by Formula 18 is used in the following manner.

$$S = \{(x_1, y_1), \ldots, (x_T, y_T)\} \quad \text{[Formula 17]}$$

$$d_t = [\widehat{MMD}^2_{X_{t+1}}, \widehat{MMD}^2_{Y_{t+1}}]^T \quad \text{[Formula 18]}$$

1. An MMD pair $d_t$ at time t is obtained using Equations (3) and (6) on the basis of a time series having a length of W (W<T) represented by Formula 19 below.

$$S^{(t)} = \{(x_{t-(W-1)}, y_{t-(W-1)}), \ldots, (x_t, y_t)\} (t=W, \ldots, T) \quad \text{[Formula 19]}$$

2. An MMD pair series $\{d_W, \ldots, d_T\}$ is obtained by processing the time series in 1 with respect to time τ=W, ..., T.
3. A feature value of classifications of a time series S is obtained using the MMD pair series in the following manner.

[Formula 20]

$$v(S) \equiv \frac{1}{T-W+1}\sum_{t=W}^{T} \Phi_D(d_t) \quad (7)$$

Here, $\Phi_D$ is a feature mapping of a positive definite kernel $k_D$.

$$\Phi_D(d_t) = k_D(d_t, \cdot) \quad \text{[Formula 21]}$$

Here, in Equation (7), Random Fourier Features (hereinafter referred to as RFF) disclosed in NPL 4 can be used for approximating $\Phi_D$ using a function called a Gaussian kernel as the kernel $k_D$.

The feature value calculation units 26 and 34 execute the above-described specific calculations with respect to the training data and the test data according to a flow as illustrated in FIG. 2.

First, in step S101, the feature value calculation units 26 and 34 read training data and test data from the training data DB 24 and a test data DB 32, respectively.

In step S102, the feature value calculation units 26 and 34 calculate weight vectors using the KKF-CEO as described above with respect to the read time-series data.

In step S103, the feature value calculation units 26 and 34 calculate kernel means according to Equations (1), (2), (4), and (5) using the calculated weight vectors.

In step S104, the feature value calculation units 26 and 34 calculate MMD pairs according to Equations (3) and (6) using the calculated kernel means.

In step S105, the feature value calculation units 26 and 34 obtains MMD pair series by repeating steps S101 to S104 with respect to time $\tau=W, \ldots, T$.

In step S106, the feature value calculation units 26 and 34 calculate feature quantities according to Equation (7) using the acquired MMD pair series.

The classifier learning unit 28 learns a classifier on the basis of the feature quantities and the classification labels (hereinafter referred to as labeled feature quantities) of the training data acquired from the feature value calculation unit 26 and provides a learned classifier to the label estimation unit 36.

The label estimation unit 36 estimates the classification labels of the test data on the basis of the feature quantities of the test data acquired from the feature value calculation unit 34 using the learned classifier and provides the estimated classification labels to the output unit 90.

[Three-Value Classification Probability Calculation Device According to First Embodiment]

Next, a three-value classification probability calculation device according to the first embodiment will be described. The three-value classification probability calculation device according to the present embodiment has a configuration similar to that of the three-value classification device except the output unit 90, and redundant description of similar constituent components will be omitted.

In the three-value classification probability calculation device according to the present embodiment, the output unit 90 outputs a probability of the causal relation of $X \rightarrow Y$, a probability of the causal relation of $X \leftarrow Y$, and a probability of the causal relation of No Causation, used when determining the values ($X \rightarrow Y$, $X \leftarrow Y$, and No Causation) of the classification labels estimated by the label estimation unit 36 rather than outputting the values of the classification labels estimated by the label estimation unit 36.

[Three-Value Classification Device According to Second Embodiment]

Next, a three-value classification device according to the second embodiment will be described. The three-value classification device according to the present embodiment has a configuration similar to that of the three-value classification device according to the first embodiment except the input unit 10, the training data generation unit 22, and the feature value calculation units 26 and 34, and redundant description of similar constituent components will be omitted.

The input unit 10 according to the present embodiment receives three-variable time-series data as training data and test data.

When training data is not input to the first input unit 12 or the training data stored in the training data DB 24 is insufficient, the training data generation unit 22 generates three-variable time-series data of which the classification labels indicating a causal relation are known as training data. Although two-variable time-series data is generated as training data in the first embodiment, three-variable time-series data is generated as training data in the present embodiment. Although various generation methods can be used, the training data generation unit 22 according to the present embodiment generates linear time-series data and nonlinear time-series data as three-variable time-series data similarly to the first embodiment. A specific generation process is simply an extension to three variables, of the generation principle of the training data generation unit 22 according to the first embodiment, and specific and detailed description thereof will be omitted.

The feature value calculation units 26 and 34 calculate feature quantities of training data and test data in a manner to be described later. Although feature quantities are calculated using an MMD pair in the first embodiment, feature quantities are calculated using an MMD quartet in the present embodiment.

$S_X$ is defined as a set of observed values of variable $X$ ($x_1, \ldots, x_t$), $S_Y$ is defined as a set of observed values of variable $Y$ ($y_1, \ldots, y_t$), and $S_Z$ is defined as a set of observed values of variable $Z$ (t>4). Using KKF-CEO, the following two kernel means can be estimated on the basis of these observed values.

[Formula 22]

$$\hat{\mu}_{X_{t+1}|S_X, S_Y, S_Z} = \sum_{r=2}^{t-2} w_r^{XYZ} \Phi_X(x_r) \quad (8)$$

$$\hat{\mu}_{X_{t+1}|S_X, S_Z} = \sum_{r=2}^{t-2} w_r^{XZ} \Phi_X(x_r) \quad (9)$$

Here, $\Phi_X$ represented by Formula 9 below is a function called a feature mapping defined by a positive definite kernel $k_X$.

$$\Phi_X(x_t) \equiv k_X(x_t, \cdot) \qquad \text{[Formula 23]}$$

Weight vectors of actual values are represented by Formula 10 below.

$$w^{XYZ} = [w_2^{XYZ}, \ldots, w_{t-2}^{XYZ}]^T, w^{XZ} = [w_2^{XZ}, \ldots, w_{t-2}^{XZ}]^T \qquad \text{[Formula 24]}$$

The weight vectors $w^{XYZ}$ and $w^{XZ}$ can be calculated using the KKF-CEO. The weight vector $w^{XY}$ can be calculated using KKF-CEO and a product kernel $k_X \cdot k_Y$.

Using kernel means obtained by Equations (8) and (9), an MMD is calculated as follows.

[Formula 25]

$$\widehat{MMD}^2_{X_{t+1}|Z} = \sum_{r=2}^{t-2} \sum_{r'=2}^{t-2} (w_r^{XYZ} w_{r'}^{XYZ} + w_r^{XZ} w_{r'}^{XZ} - 2 w_r^{XYZ} w_{r'}^{XZ}) k \times (y_r, y_{r'}) \quad (10)$$

Similarly, for the following two kernel means represented by Formula 26 below, an MMD is calculated as in Formula 27.

[Formula 26]

$$\hat{\mu}_{Y_{t+1}|S_X,S_Y,S_Z} = \sum_{r=2}^{t-2} w_r^{XYZ} \Phi_Y(y_r) \quad (11)$$

$$\hat{\mu}_{Y_{t+1}|S_Y,S_Z} = \sum_{r=2}^{t-2} w_r^{YZ} \Phi_Y(y_r) \quad (12)$$

[Formula 27]

$$\widehat{MMD}_{X_{t+1|2}}^2 = \sum_{r=2}^{t-2}\sum_{r'=2}^{t-2} (w_r^{XYZ}w_{r'}^{XYZ} + w_r^{YZ}w_{r'}^{YZ} - 2w_r^{XYZ}w_{r'}^{YZ}) k \times (y_r, y_{r'}) \quad (13)$$

Here, $\Phi_Y$ represented by Formula 28 below is a function called a feature mapping defined by a positive definite kernel $k_Y$.

$$\Phi_Y(y_t) = k_Y(y_t, \cdot) \quad \text{[Formula 28]}$$

A weight vector of actual values is represented by Formula 29 below, and similarly, can be estimated by KKF-CEO.

$$w^{YZ} = [w_2^{YZ}, \ldots, w_{t-2}^{YZ}]^T \quad \text{[Formula 29]}$$

In order to calculate a feature value of classifications of observed values represented by Formula 30 below, of three-variable time series having a length of T, an MMD quartet represented by Formula 31 is used in the following manner.

$$S = \{(x_1, y_1, z_1), \ldots, (x_T, y_T, z_T)\} \quad \text{[Formula 30]}$$

$$d_t = [\widehat{MMD}_{X_{t+1}}^2, \widehat{MMD}_{Y_{t+1}}^2, \widehat{MMD}_{X_{t+1}|Z}^2, \widehat{MMD}_{X_{t+1}|Z}^2]^T \quad \text{[Formula 31]}$$

1. An MMD quartet $d_t$ at time t is obtained using Equations (3), (6), (10), and (13) on the basis of a time series having a length of W (W<T) represented by Formula 32 below.

$$S^{(t)} = \{(x_{t-(W-1)}, y_{t-(W-1)}, z_{t-(W-1)}), \ldots, (x_t, y_t, z_t)\} (t = W, \ldots, T) \quad \text{[Formula 32]}$$

2. An MMD quartet series $\{d_W, \ldots, d_T\}$ is obtained by processing the time series in 1 with respect to time $\tau = W, \ldots, T$.
3. A feature value of classifications of a time series S is obtained using the MMD quartet series in the following manner.

[Formula 33]

$$v(S) \equiv \frac{1}{T - W + 1} \sum_{t=W}^{T} \Phi_D(d_t) \quad (14)$$

Here, $\Phi_D$ is a feature mapping of a positive definite kernel $k_D$.

$$\Phi_D(d_t) = k_D(d_t, \cdot) \quad \text{[Formula 34]}$$

Here, in Equation (14), RFF disclosed in NPL 4 can be used for approximating $\Phi_D$.

[Three-Value Classification Probability Calculation Device According to Second Embodiment]

Next, a three-value classification probability calculation device according to the second embodiment will be described. The three-value classification probability calculation device according to the present embodiment has a configuration similar to that of the three-value classification device except the output unit 90, and redundant description of similar constituent components will be omitted.

In the three-value classification probability calculation device according to the present embodiment, the output unit 90 outputs a probability of the causal relation of X→Y, a probability of the causal relation of X←Y, and a probability of the causal relation of No Causation, used when determining the values (X→Y, X←Y, and No Causation) of the classification labels estimated by the label estimation unit 36 rather than outputting the values of the classification labels estimated by the label estimation unit 36.

[Three-Value Classification Device According to Third Embodiment]

Next, a three-value classification device according to the third embodiment will be described. The three-value classification device according to the present embodiment has a configuration similar to that of the three-value classification device according to the second embodiment except the second input unit 14, the feature value calculation unit 34, and the label estimation unit 36, and redundant description of similar constituent components will be omitted.

The second input unit 14 according to the present embodiment receives time-series data related to n variables X, Y, $Z_1, \ldots,$ and $Z_{n-2}$ (n>3).

Moreover, the feature value calculation unit 34 according to the present embodiment calculates a feature value of time-series data related to a triple of variables X, Y, $Z_v$ ($v \in \{1, n-2\}$) using Equation (14).

Furthermore, the label estimation unit 36 according to the present embodiment calculates a probability of the classification label of X→Y, a probability of the classification label of X←Y, and a probability of the classification label of No Causation with respect to the feature quantities acquired by the feature value calculation unit 34 using the learned classifier learned by the classifier learning unit 26 and calculates a probability of the causal relation of X→Y, a probability of the causal relation of X←Y, and a probability of the causal relation of No Causation between variable X and variable Y by calculating the average of the probabilities. The label estimation unit 36 outputs a classification label of which the average probability is the largest among the average probabilities of the acquired three classification labels as a classification label.

[Three-Value Classification Probability Calculation Device According to Third Embodiment]

Next, a three-value classification probability calculation device according to the third embodiment will be described. The three-value classification probability calculation device according to the present embodiment has a configuration similar to that of the three-value classification device except the output unit 90, and redundant description of similar constituent components will be omitted.

In the three-value classification probability calculation device according to the present embodiment, the output unit 90 outputs an average of probabilities of the causal relation of X→Y, an average of probabilities of the causal relation of X←Y, and an average of probabilities of the causal relation of No Causation, used when determining the values (X→Y, X←Y, and No Causation) of the classification labels estimated by the label estimation unit 36 rather than outputting the values of the classification labels estimated by the label estimation unit 36.

Test Example

A set of pieces of data generated artificially was prepared and a test was performed using the classification device according to the first embodiment. Three datasets including 300 pairs of pieces of nonlinear time-series data were prepared as test data, and the lengths T' of time series in the three datasets were 50, 100, and 250, respectively. Here, the test data was prepared so that the numbers of pieces of time-series data of which the causal relations are X→Y, X←Y, and No Causation are 100.

The nonlinear time-series data of which the causal relation is X→Y was generated in the following manner.

[Formula 35]

$$X_t = 0.2X_{t-1} + 0.9N_{X_t} \quad (15)$$

$$Y_t = -0.5 + \exp(-(X_{t-1} + X_{t-2})^2) + 0.7\cos(Y_{t-1}^2) + 0.3N_{Y_t} \quad (16)$$

Here, noise components represented by Formula 36 below are given by a standard normal distribution N(0, 1).

$$E_{X_t}, E_{Y_t} \quad \text{[Formula 36]}$$

Data was prepared for the case of X←Y similarly to the case of X→Y. As for the case of No Causation, data was prepared by simply ignoring the second term in Equation (16).

Figure 3:
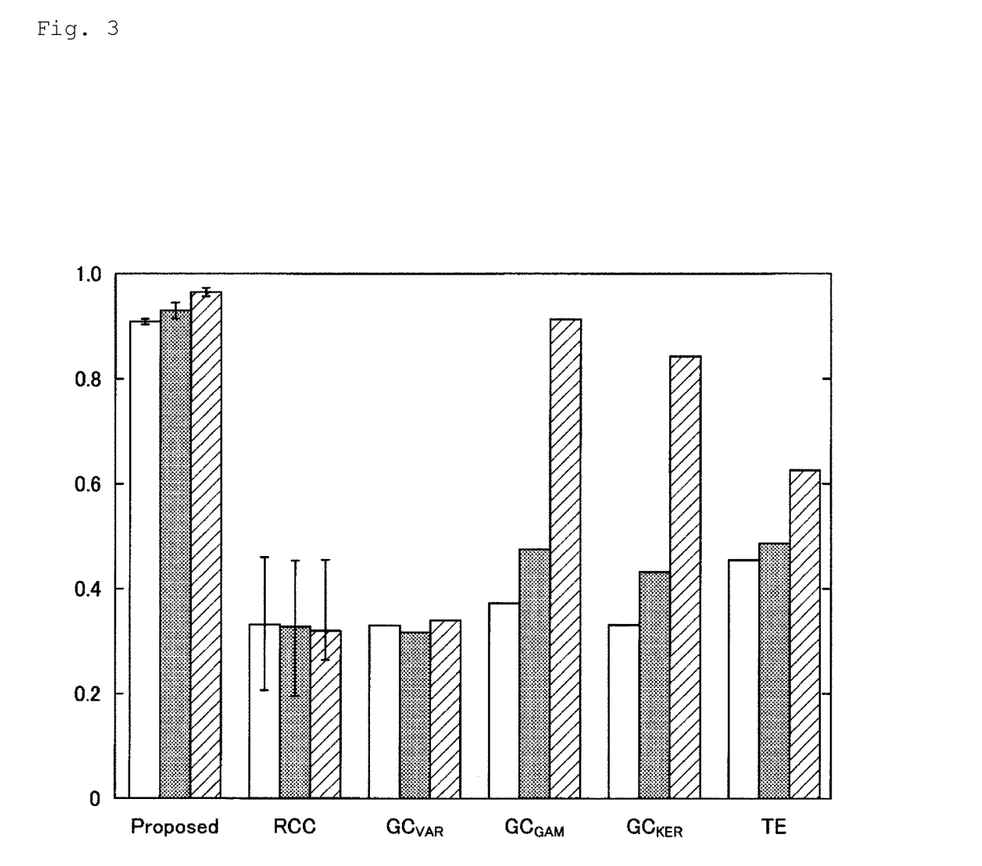
FIG. 3 is a diagram illustrating test results of a two-value classification device according to a first embodiment.

FIG. 3 illustrates test results when the classification device according to the first embodiment was applied to this set of artificial data. In FIG. 3, Proposed indicates the correct answer rates of the classification labels obtained using the first embodiment. RCC, $GC_{VAR}$, $GC_{GAM}$, $GC_{KER}$, and TE indicate the correct answer rates of the classification labels obtained using the techniques disclosed in NPL 5, 1, 2, 6, and 7, respectively.

Hereinafter, a method of setting parameters used for obtaining the test results of the first embodiment will be described.

As for parameters used for generation of training data, 7500 kinds of pieces of two-variable time-series data in which the relation between variables is linear and 7500 kinds of pieces of two-variable time-series data in which the relation between variables is nonlinear were prepared (that is, 15000 kinds in total) and the lengths of respective pieces of time-series data were 42.

In generation of feature quantities, kernel functions called Gaussian kernels were used as $k_X$, $k_Y$, $k_Z$, and $k_D$ and the parameter values thereof were determined by heuristics called median heuristic (see NPL 8 for reference). For parameters used for RFF, $n_{rff}=100$.

A random forest was used as a classifier used in the classifier learning unit 28, and an optimal value was selected from a candidate set {100, 200, 500, 1000, 2000} as a parameter representing the number of trees of the random forest by applying cross-validation to the training data. Moreover, a parameter W representing the length of time series used in the feature value calculation units 26 and 34 was set as W=12.

The test results illustrated in FIG. 3 are acquired on the basis of the setting of the above-described various parameters. In FIG. 3, since $GC_{VAR}$, $GC_{GAM}$, and $GC_{KER}G$ have regression models set in advance, a difference occurs in the fitting of regression models depending on the length of time series, and a significant difference occurs in the correct answer rate of the classification label depending on the length T' of time series. However, Proposed obtains a high correct answer rate regardless of the length of time series and shows superiority in estimation accuracy of a causal relation.

According to the above-described embodiments, feature quantities used for classification of respective pieces of test data are calculated, the calculated feature quantities are classified using a three-value classifier learned on the basis of training data, and a classification label corresponding to the test data is estimated. In this manner, it is possible to estimate a causal relation between variables of given time-series data without requiring preliminary setting of a regression model.

While embodiments of the present invention have been described, the present invention is not limited to the above-described specific embodiments, and various modifications and changed can be made without departing from the spirit of the present invention described in the claims.

REFERENCE SIGNS LIST

100 Classification device
10 Input unit
20 Learning unit
30 Inference unit
40 Output unit

The invention claimed is:

1. A computer-implemented method for estimating aspects of time-series data, the method comprising:
   generating two or more sets of time-series data for machine learning based on a normalized combination of linear time-series data and non-linear time-series data;
   receiving a correct label of three or more classification labels for machine learning, wherein the correct label represents a causal relation among the two or more sets of time-series data for machine learning, and the three or more classification labels comprise:
   a first set of time-series data is a cause of a second set of time-series data,
   the second set of time-series data is a cause of the first set of time-series data, or
   no causal relation between the first set of time-series data and the second set of time-series data;
   generating a set of feature values of respective sets of the two or more sets of time-series data; and
   training, based on a set of the generated feature values and the correct label, a classifier based on machine learning for classifying a causal relation of time series data, wherein a first output value of the classifier using the generated feature value is a maximum output value of the classifier using the correct label; and
   estimating, using the trained classifier, the causal relation among a plurality of sets of time-series data.

2. The computer-implemented method of claim 1, the method further comprising:
   when the received two or more sets of time-series data are two sets of time-series data, generating, by the trained classifier, a first set of estimated respective values of the three or more classification labels as output; and
   when the received two or more sets of time-series data includes three or more sets of time-series data, generating, by the trained classifier, an average value of a second set of estimated respective values of the three or more classification labels as output.

3. The computer-implemented method of claim 1, the method further comprising:

receiving a plurality of sets of time-series data for estimating a causal relationship; and estimating, using the trained classifier, one of the three or more classification labels for the received plurality of sets of time-series data without preconfiguring a regression model for fitting the plurality of sets of time-series data.

4. The computer-implemented method of claim 1, the method further comprising:

receiving a plurality of sets of time-series data; and determining, based on the plurality of sets of time-series data using the trained classifier, the correct classification label, wherein the correct classification label is either a set of output of the three or more classification labels or the output with the largest value.

5. The computer-implemented method of claim 1, wherein the first set of time-series data relates to trend data of foreign currency exchanges, and wherein the second set of the two or more sets of time-series data relates to trend data of stock prices.

6. A system for estimating aspects of time-series data, the system comprises:

a processor; and a memory storing computer-executable instructions that when executed by the processor cause the system to:

generating two or more sets of time-series data for machine learning based on a normalized combination of linear time-series data and non-linear time-series data;

receive a correct label of three or more classification labels for machine learning, wherein the correct label represents a causal relation among the two or more sets of time-series data for machine learning, and the three or more classification labels comprise:

a first set of time-series data is a cause of a second set of time-series data, the second set of time-series data is a cause of the first set of time-series data, or no causal relation between the first set of time-series data and the second set of time-series data;

receive the two or more sets of time-series data for machine learning;

generate a set of feature values of respective sets of the two or more sets of time-series data;

train, based on a set of the generated feature values and the correct label, a classifier based on machine learning for classifying a causal relation of time series data, wherein a first output value of the classifier using the generated feature value is a maximum output value of the classifier using the correct label; and estimate, using the trained classifier, the causal relation among a plurality of sets of time-series data.

7. The system of claim 6, the computer-executable instructions when executed further causing the system to:

when the received two or more sets of time-series data are two sets of time-series data, generate, by the trained classifier, a first set of estimated respective values of the three or more classification labels as output; and when the received two or more sets of time-series data includes three or more sets of time-series data, generate, by the trained classifier, average values of a second set of estimated respective values of the three or more classification labels as output.

8. The system of claim 6, the computer-executable instructions when executed further causing the system to:

receive a plurality of sets of time-series data for estimating a causal relationship; and estimate, using the trained classifier, one of the three or more classification labels for the received plurality of sets of time-series data without preconfiguring a regression model for fitting the plurality of sets of time-series data.

9. The system of claim 6, the computer-executable instructions when executed further causing the system to:

receive a plurality of sets of time-series data; and determine, based on the plurality of sets of time-series data using the trained classifier, the correct classification label, wherein the correct classification label is either a set of output of the three or more classification labels or the output with the largest value.

10. The system of claim 6, wherein the first set of time-series data relates to trend data of foreign currency exchanges, and wherein the second set of the two or more sets of time-series data relates to trend data of stock prices.

11. A computer-readable non-transitory recording medium storing computer-executable instructions that when executed by a processor cause a computer system to:

generating two or more sets of time-series data for machine learning based on a normalized combination of linear time-series data and non-linear time-series data;

receive a correct label of three or more classification labels for machine learning, wherein the correct label represents a causal relation among the two or more sets of time-series data for machine learning, and the three or more classification labels comprise:

a first set of time-series data is a cause of a second set of time-series data, the second set of time-series data is a cause of the first set of time-series data, or no causal relation between the first set of time-series data and the second set of time-series data;

receive the two or more sets of time-series data for machine learning;

generate a set of feature values of respective sets of the two or more sets of time-series data;

train, based on a set of the generated feature values and the correct label, a classifier based on machine learning for classifying a causal relation of time series data, wherein a first output value of the classifier using the generated feature value is a maximum output value of the classifier using the correct label; and estimate, using the trained classifier, the causal relation among a plurality of sets of time-series data.

12. The computer-readable non-transitory recording medium of claim 11, the computer-executable instructions when executed further causing the system to:

when the received two or more sets of time-series data are two sets of time-series data, generate, by the trained classifier, a first set of estimated respective values of the three or more classification labels as output; and when the received two or more sets of time-series data includes three or more sets of time-series data, generate, by the trained classifier, average values of a second set of estimated respective values of the three or more classification labels as output.

13. The computer-readable non-transitory recording medium of claim 11, the computer-executable instructions when executed further causing the system to:

receive a plurality of sets of time-series data for estimating a causal relationship; and estimate, using the trained classifier, one of the three or more classification labels for the received plurality of sets of time-series data without preconfiguring a regression model for fitting the plurality of sets of time-series data.

14. The computer-readable non-transitory recording medium of claim 11, the computer-executable instructions when executed further causing the system to:
receive a plurality of sets of time-series data; and
determine, based on the plurality of sets of time-series data using the trained classifier, the correct classification label, wherein the correct classification label is either a set of output of the three or more classification labels or the output with the largest value.

15. The computer-readable non-transitory recording medium of claim 11, wherein the first set of time-series data relates to trend data of foreign currency exchanges, and wherein the second set of the two or more sets of time-series data relates to trend data of stock prices.

\* \* \* \* \*